United States Patent [19]

Glesser

[11] 4,070,011
[45] Jan. 24, 1978

[54] ARTICULATED TOOL

[76] Inventor: Louis S. Glesser, P.O. Box 3517, Redding, Calif. 96001

[21] Appl. No.: 779,096

[22] Filed: Mar. 18, 1977

[51] Int. Cl.² ............................................... B25B 1/20
[52] U.S. Cl. ........................................ 269/45; 269/75; 269/97
[58] Field of Search ...................... 269/45, 75, 97–98, 269/254 R, 321 ME, 104, 152

[56] References Cited

U.S. PATENT DOCUMENTS

| 546,421 | 9/1895 | Duke | 269/45 |
|---|---|---|---|
| 574,529 | 1/1897 | Elliott | 269/45 |
| 2,887,974 | 5/1959 | Weinfeld | 269/45 |

Primary Examiner—Robert C. Watson
Attorney, Agent, or Firm—Roger A. Marrs

[57] ABSTRACT

A tool or jig for holding a workpiece is disclosed herein which includes a base having at least four arms joined at a common center and radiating outwardly at 90° angles to each other. The free or cantilevered end of each arm carries a universal joint interconnected with an extension having a self-biasing closure member carried thereon. The closure member may take the form of a clip. The clip is utilized for releasably holding the workpiece and a selected one of the clips constitutes an anchor member for detachably supporting the tool on a support base. Manually operated locking devices releasably secure the clip extension in a selected attitude or orientation with respect to the base.

3 Claims, 3 Drawing Figures

U.S. Patent  Jan. 24, 1978  4,070,011
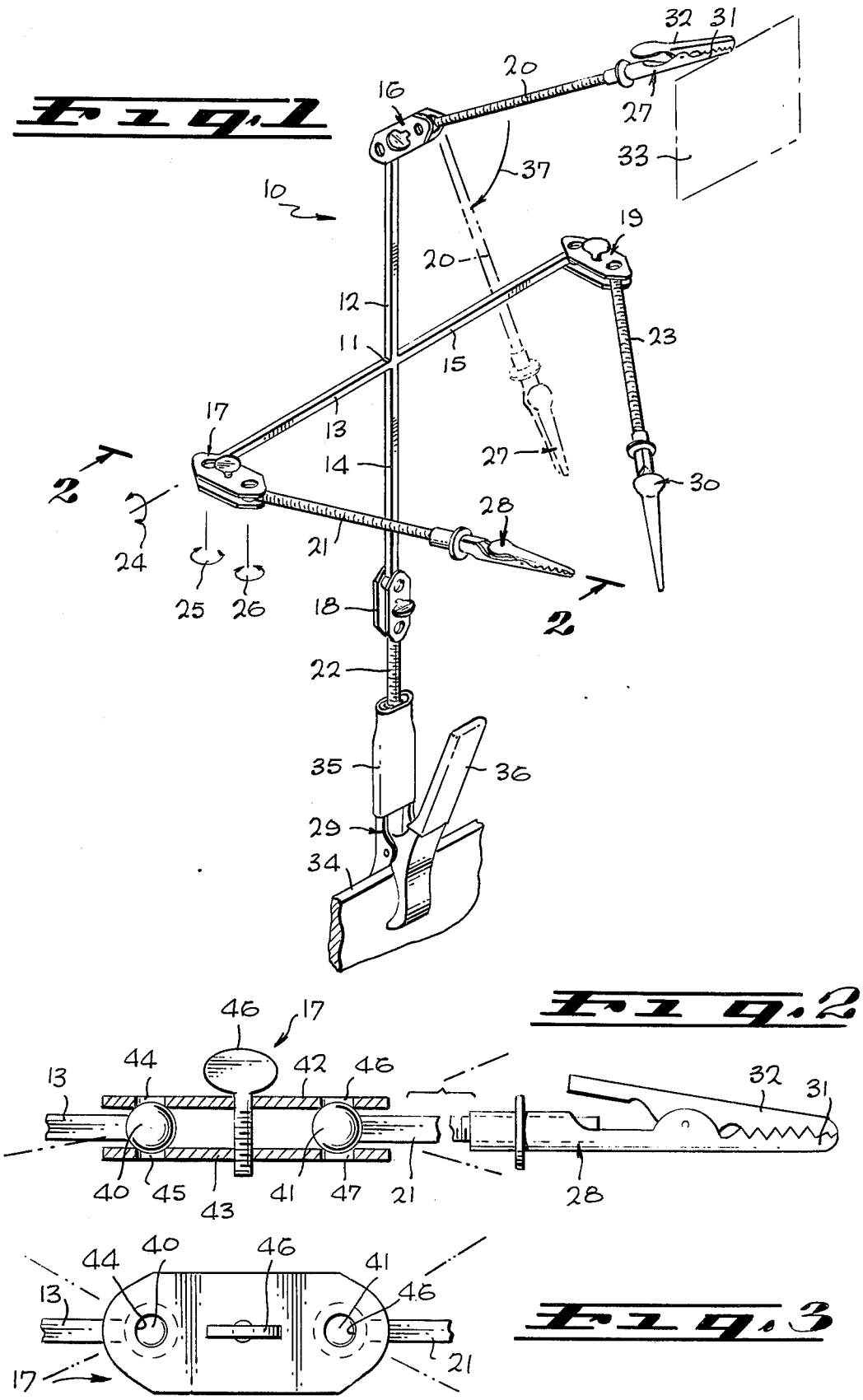

ARTICULATED TOOL

BACKGROUND OF THE INVENTION

1. Field of the Invention

The present invention relates to workpiece holding tools or jigs and more particularly to a novel articulated tool having a plurality of closure means outwardly extending from a central base for releasably supporting workpieces.

2. Brief Description of the Prior Art

In the past, it has been the conventional practice to mount a workpiece in a tool holder so that a tool may operably perform its intended function on the workpiece. Also, it has been the practice to employ a variety of holders for supporting workpieces or the like in a selected attitude or orientation with respect to its supporting surface or frame. In most instances, the support of the workpiece is sufficient for operation thereon by the tool; however, in other instances portions of the supporting frame, surrounding equipment, tool piece configuration or other physical problems are encountered when trying to orient the workpiece with respect to the tool. Since flexability and articulation of the workpiece holder are limited in prior art devices, difficulty is encountered in these latter instances.

Furthermore, in other instances where close work is intended to be performed on the workpiece, it is difficult to hold the workpiece since the tool holder covers a substantial part of the workpiece so that the operateor cannot either see the workpiece or must repeatedly remove the workpiece and reorient it in its tool holder. Also, prior tool holders and workpiece holders are extremely cumbersome, expensive and are not generally available for holding small or miniaturized parts. Conventional tool holders or workpiece holders are also limited in their usage and cannot be employed for a variety of uses such as for holding signs, notes, paper products, pencils and a variety of other uses and functions both of a utilitarian and a decorative nature.

Therefore, a long standing need is provided for utilization of an articulated workpiece holder or tool which may be readily adjusted to a variety of orientations without the use of skill and without the necessity of equipment disassembly and reassembly.

SUMMARY OF THE INVENTION

Accordingly, the above problems and difficulties are obviated by the present invention which provides a novel articulated tool having a base comprising at least four outwardly extending arms which are joined at a common center. The terminating end of each arm is employed for carrying a universal joint which interconnects with one end of an extension. The extension is provided with a self-biasing closure member on its free end which is intended for releasably engaging or holding a workpiece or the like. A selected one of the closure members constitutes an anchoring means which detachably supports the articulated tool on a support base. Manually operated means releasably secure the extension elements in a selected attitude or orientation with respect to the base so that the clips holding the workpiece support the workpiece in a desired location.

Therefore, it is among the primary objects of the present invention to provide a novel tool having multiple arms and extensions which are universally related to each other so that the tool becomes fully articulated for orienting a workpiece or the like in a desired location.

Another object of the present invention is to provide a novel articulated tool capable of supporting a plurality of workpieces either singularly or in cooperation whereby the tool may be adjusted and moved without skill of the operator.

Still another object of the present invention is to provide a novel articulated tool having a plurality of self-biasing locking members for releasably holding a workpiece in a selected orientation.

A further object of the present invention is to provide a novel articulated tool of the class described wherein a variety of articles may be supported by clip members in particular orientation for display, novelty or utility procedures.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of the novel articulated tool holder of the present invention showing the tool holder in a typical mode of operation;

FIG. 2 is an enlarged cross sectional view of the universal joint incorporated into the articulated tool holder of FIG. 1 as taken in the direction of arrows 2—2 thereof;

FIG. 3 is a plan view of the universal joint shown in FIG. 2.

DESCRIPTION OF PREFERRED EMBODIMENT

Referring to FIG. 1, the novel articulated tool holder of the present invention is illustrated in the general direction of arrow 10 which comprises a base 11 having a plurality of arms outwardly extending therefrom. The arms are indicated by numerals 12, 13, 14 and 15. The arms 12–15 inclusive are arranged at 90° angles with respect to each other and are suitably joined at their common ends by any convenient procedure.

On the free or cantilevered ends of each of the arms 12–15, there is provided a universal joint indicated by numerals 16–19 respectively which carry extensions 20–23 inclusive. By means of the universal joints, the extensions may be oriented to any particular location satisfying the needs of the user. The extensions may be pivoted or rotated about various axis such as is indicated by the curved arrows 24, 25 and 26 respectively. The extreme end of each extension is provided with a closure member such as indicated by the numerals 27–30 inclusive. The closure members are self-biasing and as illustrated, comprise a conventional clip having a fixed closure member 31 and a pivoting member 32. Between the closure members, there is supported a workpiece, tool, article or other device intended to be supported. Such an article or device is indicated by numeral 33 in broken lines and does not form a part of the present invention.

A selected one of the closure members which, in the present instance, is indicated by numeral 29 takes the form of an enlarged clip and forms an anchor means for supporting the tool holder on a supporting surface or base 34. Since the anchoring means is of heavier construction, resilient or cushioned pads 35 and 36 are included so that manual operation of the closure members may be accomplished with comfort and ease using the fingers of the user or operator.

Each of the clip members 27–30 respectively may include a snap lock fastener, interference fastener, threaded fastener or the like for securing the clip member to the terminating end of its respective extension. As noted earlier, the clip members may be moved to a selected orientation with respect to each other by rotating the extension arm and the universal joint in the direction of the arrows 24–26 inclusive. Also, each extension arm and its respective closure member may be moved in the direction of arrow 37 and the extension arm 20 with its closure member 27 will assume the position shown in broken lines.

Referring now in detail to FIG. 2, a typical universal joint included in the present invention is more clearly illustrated. In this instance, joint 17 has been selected and it can be seen that the opposing ends of arm 13 and extension 21 carry a sphere or ball 40 and 41 respectively. The balls 40 and 41 are movably connected together by means of a pair of plates 42 and 43 which are provided with coaxial holes 44 and 45 and coaxial holes 46 and 47. The plates 42 and 43 are held together by a threaded wing nut or thumb screw 46 which may be tightened to secure the extension and clip or closure member in a fixed position with respect to the arm 13. By loosening the thumb screw 46, the plates are loosened and thereby the joints constituted by the balls 40 and 41 in the coaxial holes are movable with respect to each other. As shown in broken lines in FIG. 2, the joint may be moved in an angular manner with respect to arm 13 and the extension 21 may be moved in an angular manner or in a rotatable fashion with respect to the joint or with respect to the arm 13.

In FIG. 3, additional angular movements are shown in broken lines so that the joint is fully universal and adaptable so that various orientations of the closure member with respect to the rigid arm may be selected.

Therefore, in view of the foregoing it can be seen that the tool holder the present invention may be supported on a base 34 by expanding the clip 29 so that its clip end fastens on to the edge of the support 34. Once the anchoring means has been established, the universal joints 16–19 may be adjusted to orient the extension arms as desired. In some instances, the extension arm may be rotated with respect to the joint so that added flexibility for orientation is provided. The closure members 27–30 inclusive may be employed for holding a tool, a workpiece, notes, paper clips, or other novelty items. The use of the present invention may be for novelty or for tool holding purposes. For example, the user may employ the closure members 28 and 30 for holding a part therebetween such as a model, electrical circuit or part or the like. On the other hand, a tool operator may place a workpiece in the closure means 28 and as the workpiece is held by the closure member, a tool may be brought in to contact therewith.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tool holder for supporting a plurality of articles in a selected orientation comprising:
    a base of cruciform configuration having a plurality of outwardly projecting arms from a central area in common;
    an extension associated with each of said arms so as to be in coextensive relationship;
    a universal joint movably interconnecting adjacent and opposing ends of said associated extensions and arms;
    closure means carried on the free terminating end of each of said extensions adopted to releasably engage with an article of said plurality;
    a selected one of said closure means providing an anchoring means for detachably supporting said base onto a mounting structure;
    said base includes at least four rigid arms arranged at 90° angles with respect to each other;
    said closure means are self-biasing clips having intermeshing toothed grips;
    said universal joints comprise a ball and socket joint;
    said adjacent and opposing ends of said arms and extensions carry spherical balls and said joint includes a pair of plates having coaxial openings for rollably receiving said balls; and
    said selected one of said closure clips constituting said anchoring means having a pair of broad flat closure elements and a finger gripping portion covered with a soft resilient material.

2. The invention as defined in claim 1 wherein said universal joint includes a locking means for releasably holding said extension from movement.

3. The invention as defined in claim 2 wherein said locking means comprises a thumb screw threadably engagable with said pair of plates effective to tighten and loosen said plates about said balls.

* * * * *